United States Patent [19]

Cassell et al.

[11] Patent Number: 5,187,216
[45] Date of Patent: Feb. 16, 1993

[54] PROCESS FOR THE PREPARATION OF CRYSTALLINE COPOLYESTERS

[75] Inventors: Michael L. Cassell; Waylon L. Jenkins, both of Kingsport; Gerry F. Rhodes, Gray, all of Tenn.

[73] Assignee: Eastman Kodak Company, Rochester, N.Y.

[21] Appl. No.: 687,132

[22] Filed: Apr. 18, 1991

[51] Int. Cl.⁵ .............................................. C08L 67/02
[52] U.S. Cl. .................................... 524/261; 524/262; 524/601; 524/730; 528/272; 528/282; 528/283
[58] Field of Search ................. 528/272, 282, 283; 524/261, 262, 601, 730

[56] References Cited

U.S. PATENT DOCUMENTS

| | | | |
|---|---|---|---|
| 3,876,608 | 4/1975 | Anderson et al. | 523/218 |
| 4,062,829 | 12/1977 | O'Brien | 528/287 |
| 4,097,468 | 6/1978 | James et al. | 528/274 |
| 4,282,137 | 8/1981 | Köhler et al. | 524/450 |
| 4,352,925 | 10/1982 | Petke et al. | 528/309 |
| 4,391,971 | 7/1983 | Massey et al. | 528/263 |
| 4,448,913 | 5/1984 | Coleman et al. | 524/396 |
| 4,518,731 | 5/1985 | Zamboni et al. | 524/166 |
| 4,522,958 | 6/1985 | Das et al. | 524/441 |
| 4,522,977 | 6/1985 | Gardner | 528/274 |
| 5,041,525 | 8/1991 | Jackson | 528/272 |

Primary Examiner—Nathan M. Nutter
Assistant Examiner—Jeffrey Culpeper Mullis
Attorney, Agent, or Firm—Charles R. Martin; William P. Heath, Jr.

[57] ABSTRACT

Disclosed is a process for the preparation of crystalline copolyesters from substantially amorphous, diethylene glycol-containing copolyesters wherein the a zeolite is incorporated in the substantially amorphous copolyester to promote crystallization upon heating a particulate form of the resulting copolyester at crystallizing effective temperatures.

1 Claim, No Drawings

PROCESS FOR THE PREPARATION OF CRYSTALLINE COPOLYESTERS

This invention pertains to a novel process for the preparation of crystalline copolyesters from substantially amorphous, diethylene glycol-containing copolyesters. More specifically, this invention pertains to the preparation of crystalline, diethylene glycol-containing copolyesters by heating a substantially amorphous copolyester having a zeolite intimately mixed therewith.

Heat resistant copolyesters comprised of terephthalic acid residues and a critical ratio of ethylene glycol and diethylene glycol residues are described in U.S. Pat. No. 4,352,925 which also contains a summary of the prior art pertaining to diethylene glycol-containing copolyesters, The copolyesters disclosed in U.S. Pat. No. 4,352,925 are, in general, suitable for bonding poly(ethylene terephthalate)-coated substrates such as poly(ethylene terephthalate)-coated paperboard and similar materials.

The above-described copolyesters typically are prepared by feeding terephthalic acid (or a polyesterforming ester thereof such as dimethyl terephthalate), ethylene glycol and diethylene glycol along with a catalyst or catalyst system to a reactor wherein the terephthalic acid is esterified (or dimethyl terephthalate is transesterified) with the glycols at elevated temperatures, e.g., about 200° to 220° C. The resulting material then is polycondensed at about 280° to 300° C. at reduced pressure, e.g., about 0.1 to 5 torr to form a copolyester having an inherent viscosity (I.V.) of at least 0.4 deciliters per gram (dL/g). The molten copolyester is extruded from the polycondensation zone into a water bath and the solidified polymer then is chopped into pellets.

The water-wet copolyester pellets obtained from the manufacturing procedure described must be dried prior to melt processing to avoid hydrolytic degradation of the copolyesters. Drying of the copolyesters usually is carried out by passing an inert gas through the pellets at a temperature of about 75° to 110° C. However, at this stage of the manufacturing procedure, the copolyesters, which have a glass transition temperature (Tg) of about 50° to 60° C., are substantially amorphous, e.g., consist of less than 5 volume percent crystalline material. Consequently, if the copolyester pellets are not treated further prior to drying, the pellets are softened at the drying temperatures as fuse or agglomerate forming a mass of material that is very difficult to handle.

To avoid the fusion or agglomeration problem, the substantially amorphous copolyester is heated using means which prevent agglomeration. The heating means most simple and economical to operate is hot water. However, to induce substantial crystallization the average time of heating, e.g., at about 85° to 95° C., in water is about 20 or more minutes. Such a length of time limits the rate of production of salable copolyester or requires additional crystallization facilities.

We have discovered that the rate of crystallization of the substantially amorphous polyester described hereinabove can be increased markedly by the presence in the substantially amorphous polyester of a minor amount of a zeolite. The process provided by the present invention therefore comprises the preparation of a particulate form of a crystalline copolyester containing residues of diethylene glycol by heating a particulate form of a substantially amorphous copolyester containing residues of diethylene glycol and a crystallizing-inducing effective amount of a zeolite. The presence of the zeolite in the copolyester decreases the time required for crystallization by as much as 50%.

Although the incorporation of zeolites in certain polyesters is known, the objectives accomplished by the presence of the zeolite do not relate to crystallization of the polyesters. U.S. Pat. No. 3,876,608 discloses poly(alkylene glycol) polyesters, specifically poly(ethylene terephthalate), containing 5 to 300 parts per million, preferably at least 100 ppm, of a zeolite as an inert particles to roughen the surface of film produced from the polyesters, thereby improving the winding characteristics of the poly(ethylene terephthalte) films.

U.S. Pat. No. 4,282,137 discloses the preparation of poly(ethylene terephthalate) fibers containing 0.1 to 4.0 weight percent of a zeolite to improve the dyeability of fibers. According to this patent, the zeolite is charged with an inert gas prior to adding the zeolite to granules of the poly(ethylene terephthalate). U.S. Pat. No. 4,391,971 discloses a process for reducing the acetaldehyde content of poly(ethylene terephthalate) by passing molten polyester through a molecular sieve.

The copolyesters which may be used in the present invention are substantially amorphous, e.g., having a crystalline content of less than about 5 volume percent crystalline polymer, and have an inherent viscosity of at least 0.7 dL/g, preferably about 0.74 to 0.8 dL/g, and a composition of:

A. dicarboxylic acid residues comprising at least 75 mole percent of terephthalic acid residues; and
B. diol residues comprising at least 80 mole percent of residues of (i) ethylene glycol and (ii) diethylene glycol wherein the mole ratio of (i):(ii) is about 9:1 to 1:1.

The inherent viscosities given herein are determined at 25° C. using 0.5 g of polymer per 100 mL of solvent consisting of 60 weight percent phenol and 40 weight percent tetrachloroethane. The mole percent diethylene glycol residues present in the copolyesters is determined by nuclear magnetic resonance spectrometry.

Up to about 25 mole percent of the dicarboxylic acid residue component of the polyesters may consist of residues of one or more aliphatic, alicyclic, or aromatic dicarboxylic acids other than terephthalic acid. Examples of such other dicarboxylic acids include isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polymer preparation, it is often preferable to use a functional acid derivative thereof such as the dimethyl, diethyl, or dipropyl ester of the dicarboxylic acid. The anhydrides or acid halides of these acids also may be employed where practical.

In addition to residues of ethylene glycol and diethylene glycol, the diol residues also may include up to about 20 mole percent of residues of one or more other diols such as, for example, residues of ethylene glycol, propylene glycol, 1,3-propanediol, triethylene glycol, 2,4-dimethyl-2-ethylhexane-1,3-diol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, 1,4-xylylene- diol and the like. A minor amount, e.g., up to 10 mole percent, of the glycol and/or diacid residues may be replaced with branching agents, e.g., tri-functional residues derived from trimethylolethane, trimethylolpropane and trimellitic anhydride.

The zeolites which may be used in accordance with the present invention are highly polar, crystalline, aluminosilicate materials which possess a regular surface with a high surface energy. Although not bound by any particular theory, we believe that certain zeolites are effective as crystallization aids for diethylene glycol containing copolyesters because of their ability to strongly attract polymer chain units and hold them in a conformation compatible with the chain conformation of the crystalline polymer, and thus provide a site for polymer crystallization. Because of the random variations in moieties in copolymers, copolyesters which contain more than about 15 mole percent co-monomer are, in general, very difficult to crystallize.

Examples of the zeolites include those having a wide range of pore sizes such as large pore, e.g., X- and Y-zeolites, medium pore, e.g., ZSM-5 and small pore, e.g., A-zeolites, zeolites with varying ratios of silica to alumina may be used. These zeolites are further characterized by the presence of at least one alkali, alkaline earth, transition metal or lanthanide cation. Examples of such cations include sodium, potassium, rubidium, cesium, magnesium, calcium, palladium, lanthanum and cerium which are exchangeable according to known procedures. The zeolite lattice also can be modified by a large number of tri- and tetra-valent atoms such as by replacing aluminum with boron, iron, chromium, antimony, arsenic and gallium and replacing silicon with germanium, titanium, zirconium and hafnium. Alternatively, the zeolite absorbent may be used in its acidic form wherein the cation sites of the zeolite are replaced by protons, for example, by treating the zeolite with an aqueous solution of an inorganic acid such as hydrochloric or nitric acid. The zeolites are described in detail in Chemical Engineering Progress, Feb. (1988), page 42 and Angew. Chem. Int. Ed. Engl. 27 (1988) 226. The 3A and 4A zeolites are preferred.

The crystallizing-inducing effective amount of zeolite may differ depending on the composition of the particular copolyester and the particular zeolite employed. Typically, the concentration of the zeolite in the copolyester is at least 0.01 weight percent, based on the total weight of the substantially amorphous copolyester which is crystallized in accordance with the present invention. The upper limit of the zeolite concentration normally is about 0.05 weight percent since higher concentrations may cause clarity problems and the zeolite would function as a filler rather than as a crystallization aid. The preferred concentration is about 0.01 to 0.1 weight percent.

The zeolite may be incorporated in the copolyester by conventional melt blending procedures such as batch mixing or single- or twin-screw extrusion. However, a substantial advantage afforded by the use of zeolites is that they may be dispersed in one or more of the glycols used in the manufacture of the copolyester, thereby simplifying the means of obtaining a copolyester having the zeolite intimately and thoroughly dispersed therein. Thus, a zeolite may be incorporated in the copolyesters without the necessity of modifying the equipment used in the copolyester manufacturing process. To facilitate the preparation of a dispersion of the zeolite in a glycol, it is preferred that the zeolites are fine powders having an average particle size of about 0.1 to 5 microns.

The crystallization-inducing heating is carried out using means which prevent agglomeration of the particles of copolyester. One such means involves contacting the copolyester particles or pellets with an inert gas at about 130° to 150° C. while maintaining the particles in a fluidized state. However, as stated hereinabove, the preferred mode of heating comprising contacting the particulate copolyester with water at 80° to 100° C., preferably at 85° to 95° C., normally with agitation of the particle-water mixture. The optimum temperature depends primarily on the composition of the copolyester. For example, for copolyesters consisting of residues of terephthalic acid and diol residues consisting of ethylene glycol residues and diethylene glycol residues wherein the diethylene glycol residues constitute 30 to 40 mole percent of the diol residues, best results may be obtained at a temperature less than 90° C. for 40 mole percent diethylene glycol residues whereas a temperature above 90° C. normally gives the best results in the case of 30 mole percent diethylene glycol residues.

The degree of crystallization referred to herein is the volume percent of the copolyester which is crystalline determined in accordance with the density technique described by Wlochowicz et al, Journal of Polymer Science, 11, 2719-2725 (1973). Density (g/cc) is measured using a density-gradient tube according to ASTM Standards D 1505-68 (1975) and E12-70 (1976) and as described by Oster et al, Density Gradient Techniques, Chem. Rev., 63, 257 (1963).

The degree of crystallinity which produces particles or pellets which will not agglomerate significantly when subjected to drying conditions is a crystallinity of at least 15 volume percent. Thus, the conditions of time and temperature employed in the heating of the zeolite containing, substantially amorphous copolyester should be such that a copolyester having a crystalline content of at least 15, preferably at least 20, volume percent is produced. The maximum volume percent crystallinity which may be achieved depends on the composition of the copolyester. For most copolyesters containing residues of ethylene and diethylene glycol, a volume percent crystallinity of about 20 to 40 will permit the drying of the polyester without encountering agglomeration problems.

A particularly preferred embodiment of our invention concerns the preparation of a particulate, crystalline polyester having a percent volume crystallinity of about 20 to 40 by contacting a particulate, substantially amorphous copolyester (1) having an inherent viscosity of about 0.74 to 0.8 dL/g, (2) containing about 0.01 to 0.1 weight percent of a zeolite, especially 4A zeolite, and (3) composed of:

A. dicarboxylic acid residues consisting essentially of terephthalic acid residues; and B. diol residues consisting essentially of residues of (i) ethylene glycol and (ii) diethylene glycol wherein the mole ratio of (i):(ii) is about 3:1 to 1:1;

with water at a temperature of about 85° to 95° C.

Our invention is further illustrated by the following examples.

EXAMPLE 1

A substantially amorphous copolyester having an inherent viscosity of 0.796 and containing 0.05 weight percent 4A zeolite and 32.74 mole percent diethylene glycol residues was prepared according to a conventional polymerization procedure using a titanium-manganese-phosphorus catalyst system. A mixture of dimethyl terephthalate, ethylene glycol and diethylene glycol was first subjected to ester interchange at 190° to 210° C. for 60 to 90 minutes. Upon completion of the transesterification, a slurry of 4A zeolite in ethylene glycol was added to the mixture. Polycondensation then was carried out by heating the mixture at 270° to 285° C. for 60 to 90 minutes under reduced pressure. The copolyester was pelletized and then heated in water maintained at 90° C. Samples of the copolyester were removed after 5, 10, 15, 20, 30, 40, 50, 60 and 120 minutes residence time in the hot water and the gradient tube density/volume percent crystallinity of each sample was determined. The volume percent crystallinity of each sample of copolyester taken is shown in Table I.

COMPARATIVE EXAMPLE 1

A substantially amorphous copolyester having an inherent viscosity of 0.797 and containing 35.15 mole percent diethylene glycol residues (but no zeolite) was prepared from dimethyl terephthalate, ethylene glycol and diethylene glycol according to the procedure of Example I. The copolyester was pelletized and then heated in water maintained at 90° C. Samples of the copolyester where removed after 5, 10, 15, 20, 30, 40, 50, 60 and 120 minutes residence time in the hot water and the gradient tube density/volume percent crystallinity of each sample was determined. The volume percent crystallinity of each sample of copolyester taken is shown in Table I.

TABLE I

| Minutes Residence | Percent Crystallinity Sample | |
|---|---|---|
| Time of Sample | Ex. 1 | Comp. Ex. 1 |
| 5 | 2.5 | 3.4 |
| 10 | 4.3 | 4.3 |
| 15 | 7.5 | 5.3 |
| 20 | 12.6 | 5.9 |
| 30 | 21.9 | 8.4 |
| 40 | 26.9 | 12.5 |
| 50 | 26.9 | 19.2 |

TABLE I-continued

| Minutes Residence | Percent Crystallinity Sample | |
|---|---|---|
| Time of Sample | Ex. 1 | Comp. Ex. 1 |
| 60 | 26.9 | 22.7 |
| 120 | 27.6 | 28.4 |

The data of Table I show that for the copolyester containing the zeolite, the time required for crystallization to reach 50% of maximum is 24 minutes and the time to reach 90% of maximum is 35 minutes. In contrast, the copolyester containing no zeolite requires 44 minutes of heating to reach 50% of maximum crystallization and 80 minutes to reach 90% of maximum.

When the procedure of Example 1 was modified by adding either sodium carbonate or potassium acetate in ethylene glycol prior to the ester interchange reaction and omitting the zeolite, a copolyester having a satisfactory inherent viscosity was not obtained. For example, a copolyester containing 0.05 weight percent potassium acetate had an inherent viscosity of only 0.205.

The invention has been described in detail with particular reference to preferred embodiments thereof, but it will be understood that variations and modifications can be effected within the spirit and scope of the invention.

We claim:

1. A process for the preparation of a particulate, crystalline polyester having a percent volume crystallinity of about 20 to 40 by contacting a particulate copolyester (1) having an inherent viscosity of about 0.74 to 0.8 dL/g as determined at 25° C. using a 0.5 g of polymer per 100 Ml of solvent consisting of 60 weight percent phenol and 40 weight percent tetrachloroethane, (2) having a crystalline content of less than 5 volume percent, (3) containing about 0.01 to 0.1 weight percent of a zeolite and (4) composed of:
   A. dicarboxylic acid residues consisting essentially of terephthalic acid residues; and
   b. diol residues consisting essentially of residues of (i) ethylene glycol and (ii) diethylene glycol wherein the mole ratio of (i):(ii) is about 3:1 to 1:1;
with water at a temperature of about 85° to 95° C.

* * * * *